US008832582B2

(12) United States Patent
Dwyer et al.

(10) Patent No.: US 8,832,582 B2
(45) Date of Patent: Sep. 9, 2014

(54) INTERACTIVE CONTROL OF THE CURVATURE OF LINKS

(75) Inventors: Timothy Dwyer, Seattle, WA (US); Nathalie Henry Riche, Seattle, WA (US); Bongshin Lee, Issaquah, WA (US); Sheelagh Carpendale, Calgary (CA)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 13/421,855

(22) Filed: Mar. 15, 2012

(65) Prior Publication Data

US 2013/0246958 A1 Sep. 19, 2013

(51) Int. Cl.
*G06F 3/048* (2013.01)

(52) U.S. Cl.
USPC .......................................... 715/771

(58) Field of Classification Search
None
See application file for complete search history.

(56) References Cited

U.S. PATENT DOCUMENTS

| | | | |
|---|---|---|---|
| 5,363,479 A | 11/1994 | Olynyk | |
| 5,751,931 A * | 5/1998 | Cox et al. | 345/440 |
| 5,798,769 A | 8/1998 | Chiu et al. | |
| 6,154,212 A * | 11/2000 | Eick et al. | 715/848 |
| 6,377,259 B1 * | 4/2002 | Tenev et al. | 345/440 |
| 6,732,114 B1 | 5/2004 | Aamodt et al. | |
| 7,110,389 B2 | 9/2006 | Ramanan et al. | |
| 7,932,907 B2 | 4/2011 | Nachmanson et al. | |
| 2001/0045952 A1 * | 11/2001 | Tenev et al. | 345/440 |
| 2002/0085002 A1 * | 7/2002 | Lamping et al. | 345/441 |
| 2002/0196292 A1 * | 12/2002 | Itoh et al. | 345/853 |
| 2011/0154234 A1 | 6/2011 | Winternitz et al. | |
| 2011/0181595 A1 | 7/2011 | Nachmanson et al. | |

FOREIGN PATENT DOCUMENTS

| | | |
|---|---|---|
| EP | 0977154 A2 | 2/2000 |
| EP | 0702331 B1 | 6/2002 |
| EP | 0825559 B1 | 3/2004 |

OTHER PUBLICATIONS

"Adobe Illustrator CS5", Retrieved at <<www.adobe.com/Illustrator>>, Retrieved date : Mar. 5, 2012, pp. 3.
Cui, et al., "Geometry-Based Edge Clustering for Graph Visualization", Retrieved at <<http://ieeexplore.ieee.org/stamp/stamp.jsp?tp=&arnumber=4658140>>, Proceedings of IEEE Transactions on Visualization and Computer Graphics, vol. 14, No. 6, Nov./Dec. 2008, pp. 1277-1284.
Dobkin, et al., "Implementing a General-purpose Edge Router", Retrieved at <<http://citeseerx.ist.psu.edu/viewdoc/download?doi=10.1.1.87.7206&rep=rep1&type=pdf>>, Proceedings of GD '97, 1997, pp. 262-271.
Ersoy, et al., "Skeleton-Based Edge Bundling for Graph Visualization", Retrieved at <<http://ieeexplore.ieee.org/stamp/stamp.jsp?tp=&arnumber=6065003>>, Proceedings of IEEE Transctions on Visualization and Computer Graphics, vol. 17, No. 12, Dec. 2011, pp. 2364-2373.

(Continued)

*Primary Examiner* — William Bashore
*Assistant Examiner* — Rayeez Chowdhury
(74) *Attorney, Agent, or Firm* — Kevin Sullivan; Kate Drakos; Micky Minhas

(57) ABSTRACT

A link curvature processing module enables a user with the ability to control the curvature of links in a node-link diagram. As a node-link diagram is displayed to a user, the user may interact with the diagram and adjust the curvature of one or more links in the diagram to improve the readability of the diagram. The user's modification to the curvature of a link alters the shape of the link so that the position of the nodes connected to the link does not change. By providing the user with such control, the user is able to tailor the visual display of the links to the user's preference.

20 Claims, 16 Drawing Sheets

(56) References Cited

OTHER PUBLICATIONS

Fekete, et al., "Overlaying Graph Links on Treemaps",Retrieved at <<http://hcil.cs.umd.edu/trs/2003-32/2003-32.pdf>>, Proceedings of foVis '03 Conference Compendium (de mo), 2003, pp. 2.
Freivalds, et al., "Curved Edge Routing", Retrieved at <<http://www.gradetools.com/karlisf/curved.ps>>, Proceedings of FCT '01, 2001, pp. 126-137.
Gasner, et al., "Multilevel Agglomerative Edge Bundling for Visualizing Large Graph", Retrieved at <<http://ieeexplore.ieee.org/stamp/stamp.jsp?tp=&arnumber=5742389>>, Proceedings of PcificVis'II, 2011, pp. 187-194.
Holten, Danny, "Hierarchical Edge Bundles: Visualization of Adjacency Relations in Hierarchical Data", Retrieved at <<http://ieeexplore.ieee.org/stamp/stamp.jsp?tp=&arnumber=4015425>>, Proceedings of IEEE Transactions on Visualization and Computer Graphics, vol. 12, No. 5, pp. 74I-748.
Holten, et al., "Force-Directed Edge Bundling for Graph Visualization", Retrieved at <<http://www.win.tue.nl/~dholten/papers/forcebundles_eurovis.pdf>>, Proceedings of IEEE-VGTC Symposium oN Visualization, vol. 28, No. 3, 2009, pp. 983-990.
Holten, et al., "A User Study on Visualizing Directed Edges in Graphs", Retrieved at <<http://www.win.tue.nl/~dholten/papers/directed_edges_chi.pdf>>, Proceedings of CHI '09,Apr. 4-9, 2009, pp. 759-766.
Hurter, et al., MoleView: An Attribute and Structure-based Semantic Lens for Large Element-based Plots., Retrieved at <<http://ieeexplore.ieee.org/stamp/stamp.jsp?tp=&arnumber=6065028>>, Proceedings of IEEE TVCG, vol. 17, No. 12, pp. 2600-2609.
"Inkscape Draw Freely", Retrieved at <<http://inkscape.org>>, Retrieved date : Mar. 5, 2012, p. 1.
Kaufmann, et al., "Drawing Graphs: Methods and Models", Retrieved at <<https://www.ads.tuwien.ac.at/publications/bib/pdf/Weiskircher01.pdf>>, Proceedings of LNCS 2025, Oct. 13, 1999, pp. 33.
Lambert, et al., "Winding Roads: Routing Edges into Bundles", Retrieved at <<http://hal.archives-ouvertes.fr/docs/00/49/52/79/PDF/Winding_Roads_Eurovis2010.pdf>>, Proceedings of Eurographics/IEEE-VGTC Symposium on Visualization 2010, vol. 29, No. 3, 2010, pp. 853-862.
Luo, et al., "Ambiguity-Free Edge-Bundling for Interactive Graph Visualization",Retrieved at <<http://ieeexplore.ieee.org/stamp/stamp.jsp?tp=&arnumber=5887331>>, Proceedings of IEEE Transactions on Visulaization and Computer Graphics, vol. 18, No. 10, 2012, pp. 12.
Moscovich, et al., "Topology-Aware Navigation in Large Network", Retrieved at <<http://www.lri.fr/~chevalie/publications/chevalier_CHI09.pdf>>, Proceedings of C HI'09, 2009, pp. 2319-2328.
Purchase, Helen, "Which Aesthetic has the Greatest Effect on Human Understanding?", Retrieved at <<https://secure.cs.uvic.ca/twiki/pub/Research/Chisel/ComputationalAestheticsProject/purchase-understanding.pdf>>, Proceedings of GD '97, 1997, pp. 248-261.
Purchase, et al., "Evaluating graph drawing aesthetics: defining and exploring a new empirical research area", Retrieved at <<http://www.dcs.gla.ac.uk/publications/PAPERS/8177/final-submission.pdf>>, 2004, pp. 50.
Pupyrev, et al., "Edge Routing with Ordered Bundles", Retrieved at <<http://research.microsoft.com/en-us/um/people/holroyd/papers/bundle.pdf>>, Proc. GD 'I I , 2011, pp. 135-146.
Riche, et al., "Understanding Interactive Legends: A Comparative Evaluation with Standard Widgets", Retrieved at <<http://citeseerx.ist.psu.edu/viewdoc/download?doi=10.1.1.173.8090&rep=rep1&type=pdf>>, Proceedings of Computer Graphics Forum, (Proc. EuroVis' I 0), vol. 29, No. 3, 2010, pp. 1193-1202.
Schmidt, et al., "A Set of Multi-Touch Graph Interaction Techniques", Retrieved at <<http://citeseerx.ist.psu.edu/viewdoc/download?doi=10.1.1.188.4156&rep=rep1&type=pdf>>, Proc. ITS '10, Nov. 2010, pp. 4.
Selassie, et al., "Divided Edge Bundling for Directional Network Data", ,Retrieved at <<http://ieeexplore.ieee.org/stamp/stamp.jsp?tp=&arnumber=6065002>>, Proceedings of IEEE TVCG (Proc. InfoVis 'I I), vol. 17, No. 2, Dec. 2011, pp. 2354-2463.
Spritzer, et al., "Design and Evaluation of MagnetViz—A Graph Visualization Tool", Retrieved at <<http://ieeexplore.ieee.org/stamp/stamp.jsp?tp=&arnumber=5928333>>, Proceedings of IEEE Trans Vis Comput Graph, vol. 18, No. 10, 2012, pp. 14.
Ware, et al., "Information Visualization: Perception for Design", Retrieved at <<http://www.ifs.tuwien.ac.at/~silvia/wien/vu-infovis/articles/book_information-visualization-perception-for-design_Ware_Chapter1.pdf>>, 2004, pp. 34.
Wikipedia, "Procrustes Analysis", Retrieved at <<http://en.wikipedia.org/wiki/Procrustes_analysis>>, Mar. 6, 2012, pp. 5.
Wong, et al., "Supporting Interactive Graph Exploration with Edge Plucking", Retrieved at <<http://pages.cpsc.ucalgary.ca/~sheelagh/wiki/uploads/Main/Publications/Wong_2005_SIG.pdf>>, Proc. VDA '07, 2007, pp. 12.
Wong, et al., "Edgelens: An Interactive Method for Managing Edge Congestion in Graphs",Retrieved at <<http://ieeexplore.ieee.org/stamp/stamp.jsp?tp=&arnumber=1249008>>, Proceedings of InfoVis'03, 2003, pp. 7-15.
Yi, et al., "Dust & Magnet: Multivariate Information Visualization Using a Magnet Metaphor", Retrieved at <<http://citeseerx.ist.psu.edu/viewdoc/download?doi=10.1.1.157.6563&rep=rep1&type=pdf>>, 2005, pp. 1-18.
"International Search Report", Mailed Date: Jun. 21, 2013, Application No. PCT/US2013/028480, Filed Date: Mar. 1, 2013, pp. 8.
Bartram, et al., "Filtering and Brushing with Motion", Retrieved at <<http://jhc.unh.edu/sites/default/files/publications/Bartram02_InfoVis_Filtering_and_brushing_with_Motion.pdf>>, Proceedings of InfoVis'02, 6G-79, 2002, pp. 1-17.
Frisch, et al., "Investigating Multi-Touch and Pen Gestures for Diagram Editing on Interactive Surfaces", Retrieved at <<http://www.isg.cs.ovgu.de/uise/Forschung/Publikationen/2009-ITS-DiagramGestures.pdf >>, Proceeding of ITS '09 Proceedings of the ACM International Conference on Interactive Tabletops and Surfaces, Nov. 23, 2009, pp. 149-156.
Ghoniem, et al., "On the Readability of Graphs Using Node-Link and Matrix-Based Representations: A Controlled Experiment and Statistical Analysis", Retrieved at <<http://citeseerx.ist.psu.edu/viewdoc/download?doi=10.1.1.180.5768&rep=rep1&type=pdf>>, Proceedings of Journal Information Visualization, vol. 4, Issue 2, May 19, 2005, pp. 114-135.
Beck, et al., "Visually Exploring Multi-Dimensional Code Couplings", Retrieved at <<http://ieeexplore.ieee.org/stamp/stamp.jsp?tp=&arnumber=6069455>>, Proceeding: 6th IEEE International Workshop on Visualizing Software for Understanding and Analysis (VISSOFT), 2011, Sep. 29, 2011. pp. 1-8.
Qu, et al., "Controllable and Progressive Edge Clustering for Large Networks", Retrieved at <<http://citeseerx.ist.psu.edu/viewdoc/download?doi=10.1.1.109.663&rep=rep1&type=pdf >>,Proceedings of the 14th international conference on Graph drawing, GD'06, Sep. 2006, pp. 399-404.
McGuffin, et al., "Interaction Techniques for Selecting and Manipulating Subgraphs in Network Visualizations", Retrieved at <<http://ieeexplore.ieee.org/stamp/stamp.jsp?arnumber=05290697>>,Proceedings of IEEE Transactions on Visualization and Computer Graphics, vol. 15, No. 6, Nov. 2009, pp. 937-944.
Spritzer, et al., "Case Study of Co-authorship Networks Using a Tool for Graph Visualization", Retrieved at <<http://www.lbd.dcc.ufmg.br:8080/colecoes/wiva/2008/005.pdf>>, Proceedings of Workshop on Information Visualization and Analysis in Social Networks—WIVA 2008, 2008, pp. 41-50.
Tudoreanu, et al., "Legends as a Device for Interacting with Visualizations", Retrieved at <<http://citeseerx.ist.psu.edu/viewdoc/download?doi=10.1.1.7.9178&rep=rep1&type=pdf>>, Proceedings of Technical Report WUCS-01-44, Washington University, Department of Computer Science, St. Louis, MO, 2001, pp. 7.

\* cited by examiner

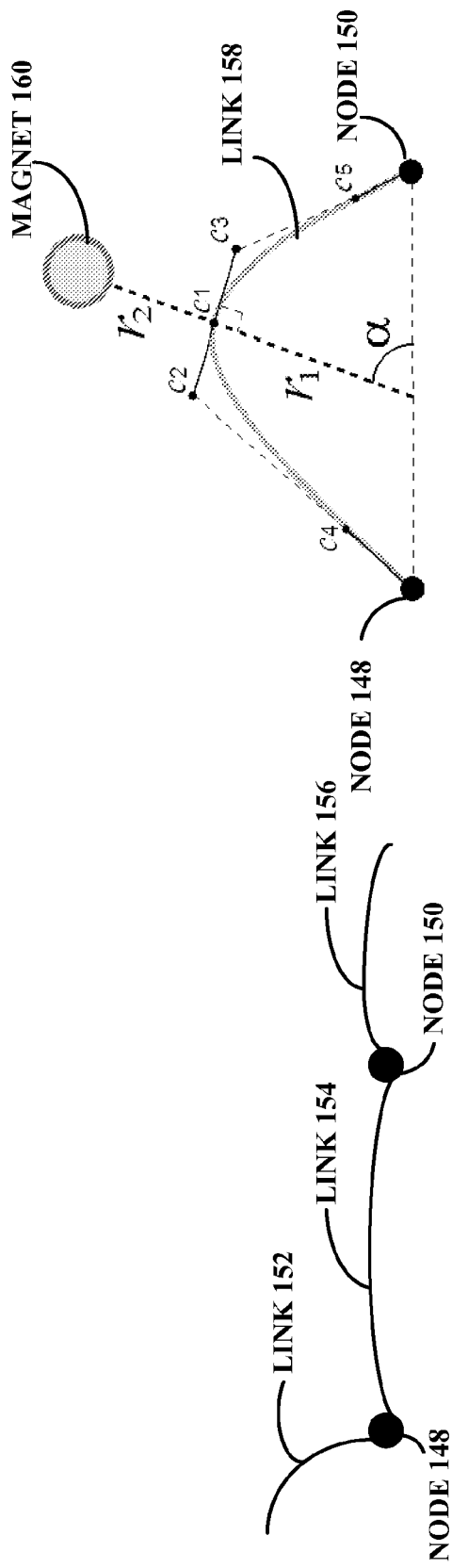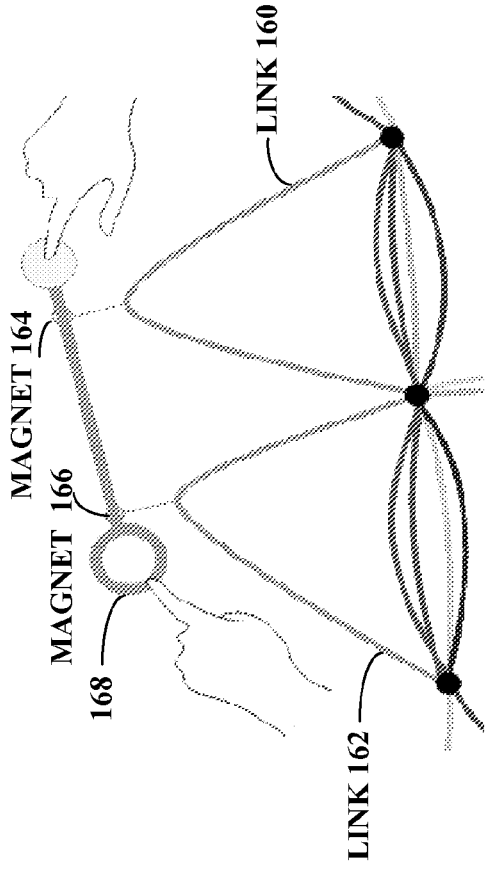
FIG. 5A
FIG. 5B
FIG. 5C

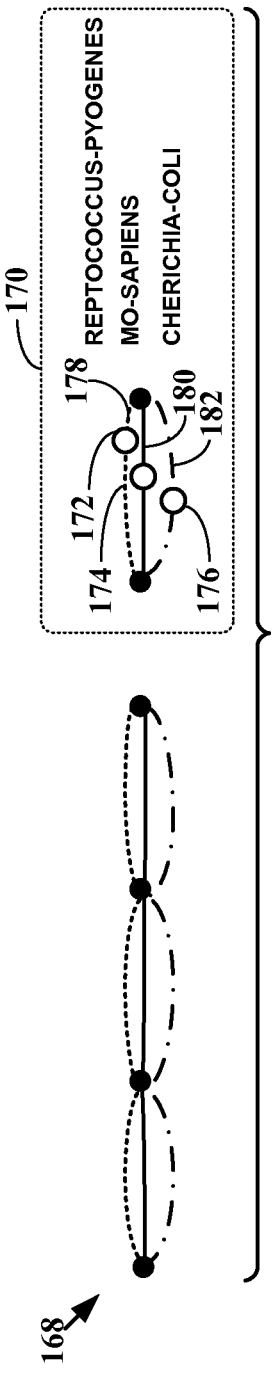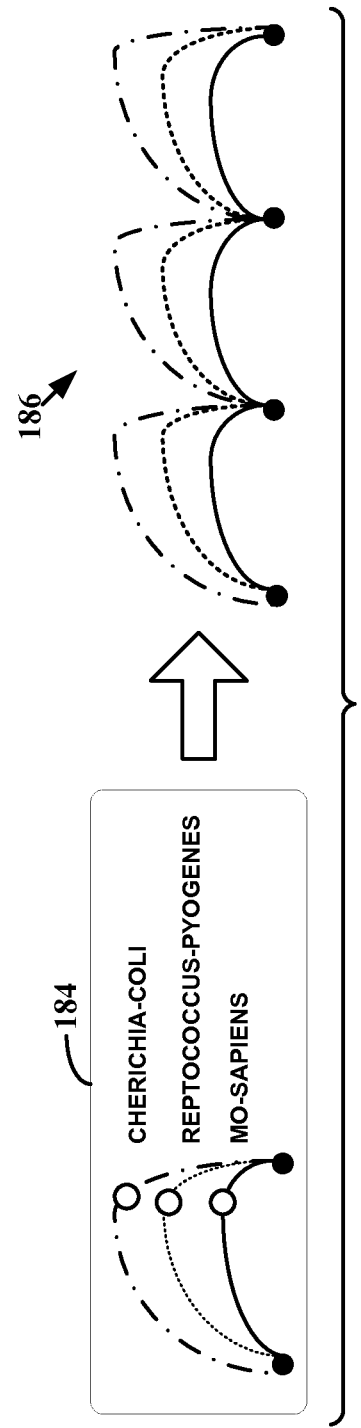
FIG. 6A
FIG. 6B

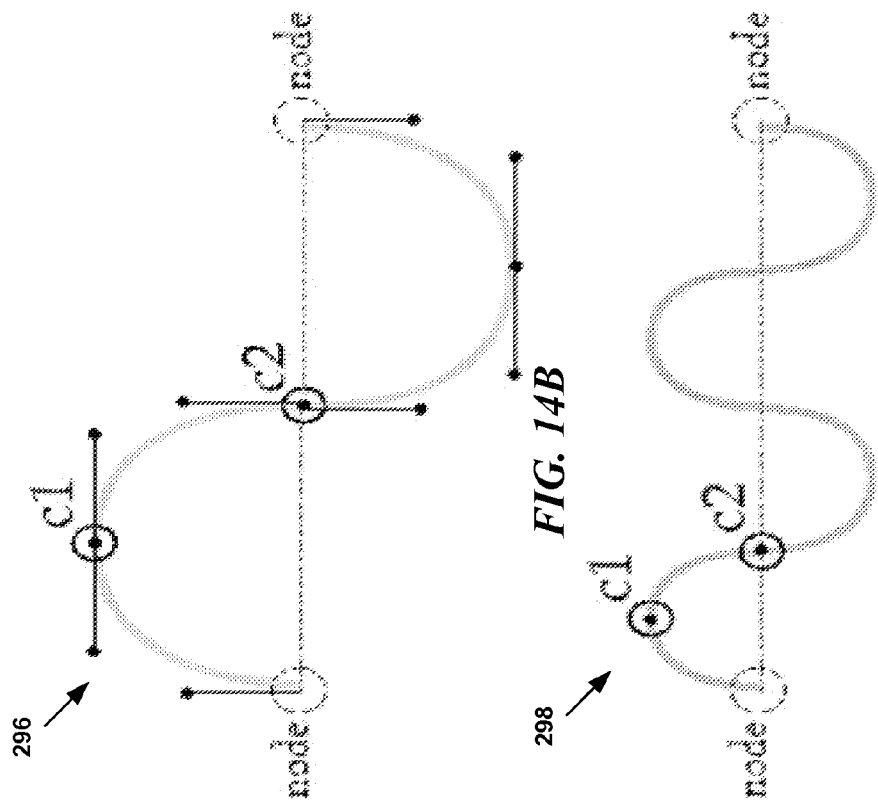
*FIG. 14B*
*FIG. 14C*
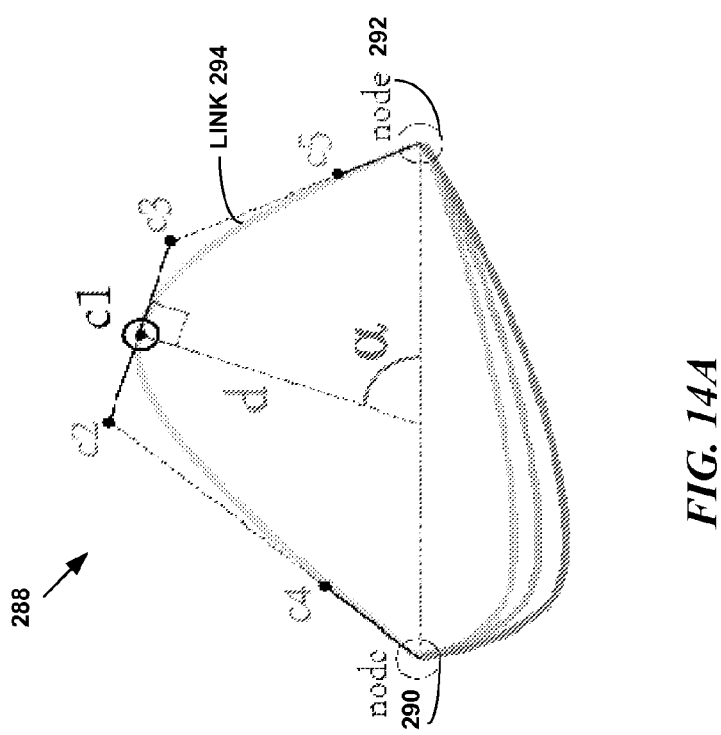
*FIG. 14A*

INTERACTIVE CONTROL OF THE CURVATURE OF LINKS

BACKGROUND

A graph is a data structure commonly used to present data in a structured manner. A graph consists of nodes and links where each node represents an object and a link, also known as an "edge", connects a source node to a target node. Graphs are commonly used in a variety of applications to model the flow of information, to model the relationship between entities, and so forth. For example, in a social network, the nodes of the graph may represent individuals and the edges may represent a relationship between two individuals. In an airline network, the nodes may represent cities and a sequence of edges may represent routes from one city to another.

A node-link diagram is a construct used to visualize a graph where a graphical object, such as a box or dot, depicts a node and a curve is used to represent a link between two nodes. A node-link diagram having a large number of nodes and links suffers from visual clutter. The visual clutter is often attributable to link congestion when multiple links overlap each other making it difficult to distinguish a particular link or a subset of links.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user may interact with a node-link diagram, on the fly, to identify portions of the diagram that require additional visual clarity. In particular, congested links may be separated in numerous ways in order to improve the readability of the diagram. An interactive link fanning technique enables a user to alter the curvature of links connected to a node by spreading or fanning out the links to a user-specified fanning radius. A minimum separation angle is determined based on the user-specified fanning radius which is then used to determine the minimum separation angle needed between adjacent links. The smooth curve used to represent the links is calculated to minimize the length of each link from its source node to its target node subject to the constraint that link curves must be smooth and separated by a minimum amount.

An interactive link bundling technique enables a user to select a subset of links which should share a common path through automatically generated or user defined control points. The user can directly manipulate the location and size of these control points to further refine the bundle path or to adjust the separation of link curves within the bundle.

An interactive link magnet technique enables a user to use a draggable graphic object, referred to as an interactive link magnet, to magnetically attract links having a data attribute that matches the interactive link magnet. The magnetic attraction alters the curvature of the matching links in a direction towards the magnet thereby separating out the matching links from the rest of the node-link diagram for better visualization.

An interactive link legends technique enables a user to control the shape of a model curve that is part of the node-link diagram's legend. A user may interact with one or more control points on the model curve to alter the curvature of a link associated with the model curve. The resulting curvature is then propagated throughout the node-link diagram to all links associated with the model curve.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 5A-5C are exemplary illustrations showing interactive link magnets.

FIGS. 6A-6B are exemplary illustrations showing interactive link legends.

FIGS. 14A-14C are exemplary illustrations showing the interactions used to alter the curvature of the links in the interactive link legends.

DETAILED DESCRIPTION

Various embodiments pertain to a technology for enabling a user to control the curvature of links in a node-link diagram. As a node-link diagram is displayed to a user, the user may interact with the diagram and adjust the curvature of one or more links in the diagram to improve the readability of the node-link diagram. The links in a node-link diagram are presented as smooth curves drawn as splines by carefully constructed control points. The curvature of a link may be altered such that the amplitude and/or skew angle of the smooth curve is enlarged while the nodes connected to the link remain in the same position. By providing the user with such control, the user is able to tailor the visual display of the links to the user's preference.

The embodiments cover four techniques: interactive link fanning; interactive bundling; interactive link magnet; and interactive link legends. Each technique provides a user with a different capability to interact, in real time, with a node-link diagram. The interactive link fanning technique enables a user to alter the curvature of links connected to a node by spreading or fanning out the links to a user-specified fanning radius. Curve control points are automatically located in order to achieve a user-specified minimum separation angle between adjacent links. The smooth curve used to represent the links is calculated to respect the minimum separation angle while minimizing the length of each link from its source node to its target node.

An interactive link bundling technique enables a user to select a subset of links which should share a common path through automatically generated or user defined control points. The user can directly manipulate the location and size of these control points to further refine the bundle path or to adjust the separation of link curves within the bundle.

An interactive link magnet technique enables a user to use a draggable graphic object, referred to as an interactive link magnet, to magnetically attract links having a data attribute that matches the interactive link magnet. The magnetic attraction alters the curvature of the matching links in a direction towards the magnet thereby separating out the matching links from the rest of the node-link diagram for better visualization.

An interactive link legends technique enables a user to control the shape of a model curve that is part of the node-link diagram's legend. A user may interact with one or more control points on the model curve to alter the curvature of a link associated with the model curve. The resulting curvature is then propagated throughout the node-link diagram to all links associated with the model curve.

Figure 1:
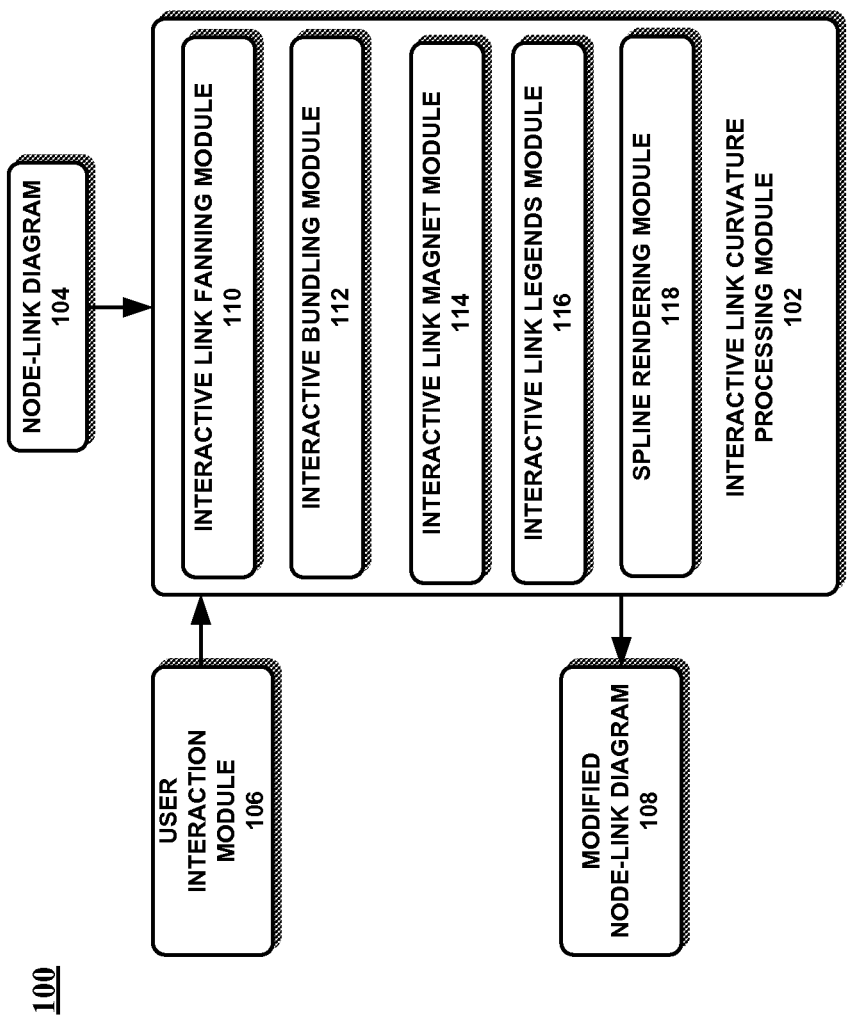
FIG. 1 illustrates an exemplary system that provides a user with capabilities to control the curvature of links within a node-link diagram.

Attention now turns to a discussion of an exemplary system enabling a user to interactively control the link curvature in node-link diagrams. FIG. 1 illustrates a block diagram of an exemplary system 100 having an interactive link curvature processing module 102 that receives a node-link diagram 104 and user actions detected by a user interaction module 106. Based on the user actions detected, the interactive link curvature processing module 102 alters the curvature of one or more links and engages a spline rendering module 118 to render a modified portion of the node link diagram 104.

The interactive link curvature processing module 102 may include any one or more integrated link curvature techniques, such as an interactive link fanning module 110, an interactive bundling module 112, an interactive link magnet module 114, and/or an interactive legends module 116. The interactive link curvature processing module 102 modifies the node-link diagram 104 in accordance with the user actions thereby generating a modified node-link diagram 108 tailored to the user's preference.

The system 100 may be implemented on a computing device that may be any type of electronic device capable of executing programmable instructions. The computing device may be implemented as a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

Figure 2:
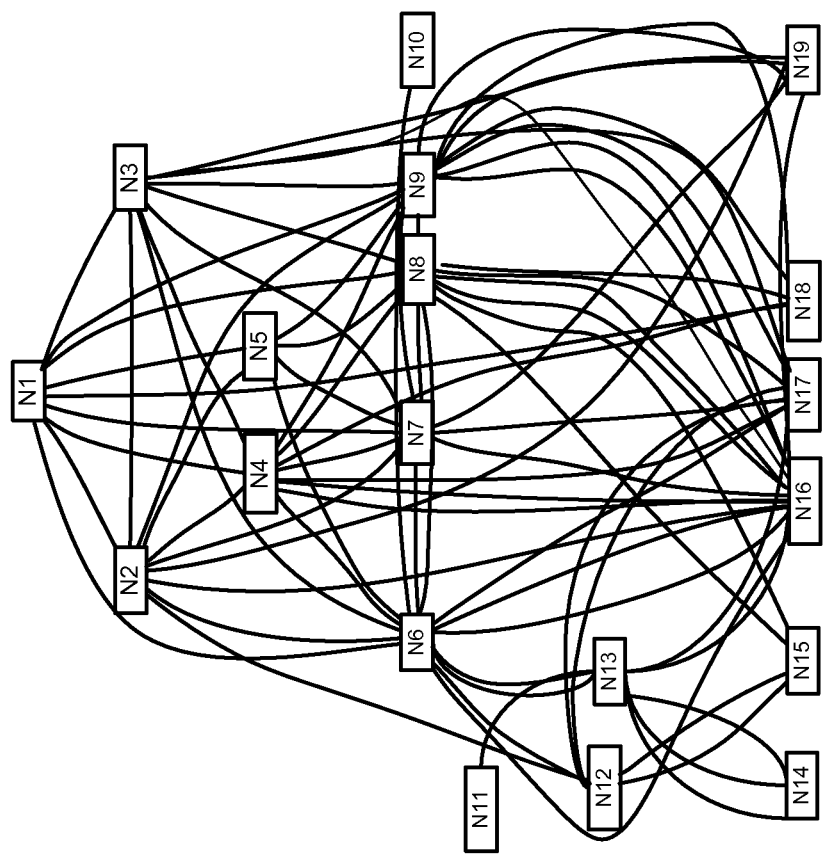
FIG. 2 illustrates an exemplary node-link diagram.

A node-link diagram 104 is a graph having a set of nodes and a set of links. A link is an edge that connects two nodes. A node-link diagram 104 is a data structure that may be used to represent any type of system, such as, without limitation, a social network, a state machine associated with a physical system, an air traffic network, a computer program's data flow, a communication network, and so forth. Referring to FIG. 2, there is shown a node-link diagram 104 having a collection of nodes, labeled N1-N19, and links connecting the nodes to each other. The node-link diagram 104, as shown in FIG. 2, shows a dense collection of links that are difficult to distinguish within the node-link diagram 104. The interactive link curvature processing module 102 is configured to improve the visual representation of links within the node-link diagram 104 thereby improving the user's understanding of the node-link diagram 104.

It should be noted that the embodiments are not limited to a node-link diagram and the embodiments may be applied to other types of graphical representations, such as, without limitations, link overlays on treemaps, trees, graphs, and so forth.

Referring back to FIG. 1, a user may interact with the interactive link curvature processing module 102 through a user interaction module 106. The user interaction module 106 represents any functionality for processing user inputs that may be received by any type of input device or combination of input devices. The input device may be mouse, keyboard, a touch screen display, and the like. The user interaction module 106 may detect a mouse click, keystroke, gesture, touch, voice command, and any other type of user action. When the user action is detected while the node-link diagram 104 is displayed, the user action is transmitted to the interactive link curvature processing module 102.

Figure 3A:
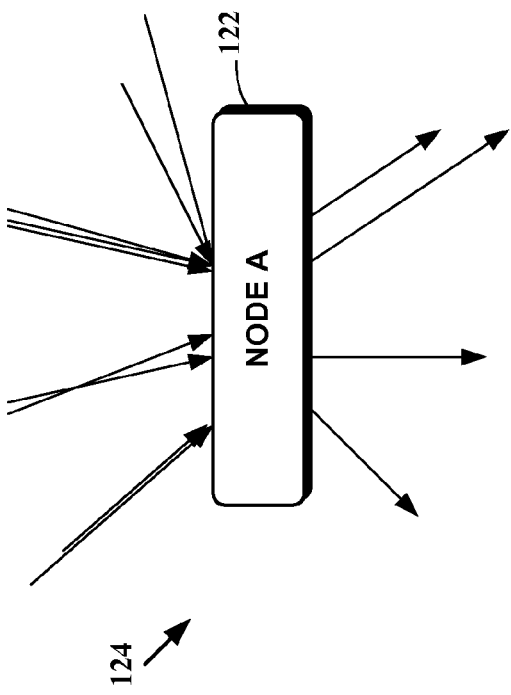
FIGS. 3A-3C are exemplary illustrations showing interactive link fanning.
Figure 3B:
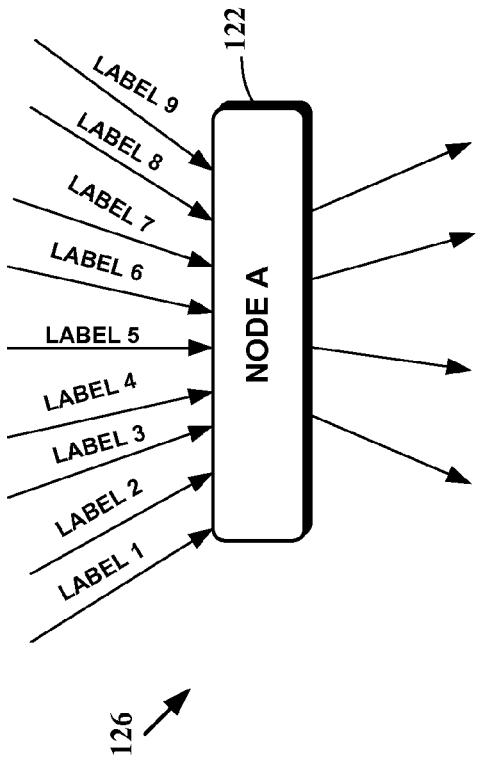
Figure 3C:
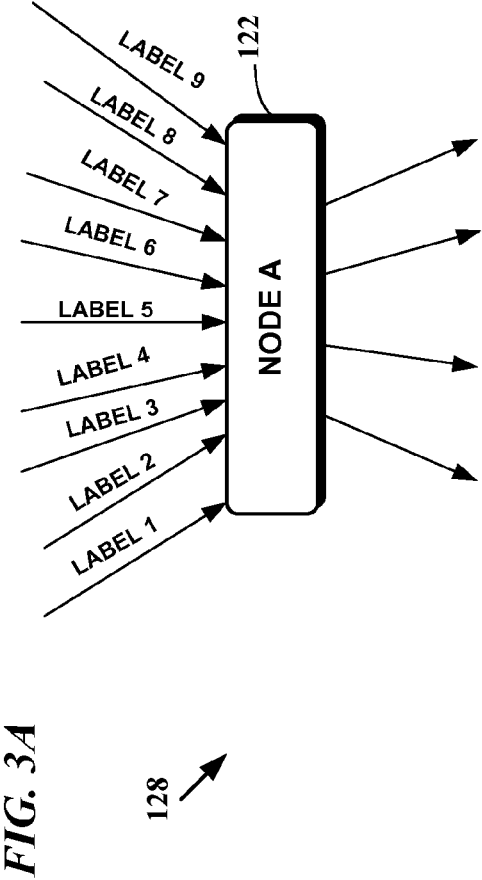

The interactive link fanning module 110 may be used to expand the separation distance between adjacent links at one or more nodes thereby improving the readability of the links associated with a particular node. Referring to FIG. 3A, there is shown a portion of a node-diagram 124 having a Node A 122 with nine links entering the node and four links exiting the node. Several of the links entering the node overlap making it difficult to understand the flow that the links represent. FIG. 3B shows the node-link diagram 126 with the links associated with Node A 122 fanned out so that there is space between each link. The space between each link may be used to insert a label, LABEL 1-LABEL 9, for each link in the node-link diagram 128 as shown in FIG. 3C.

Figure 4:
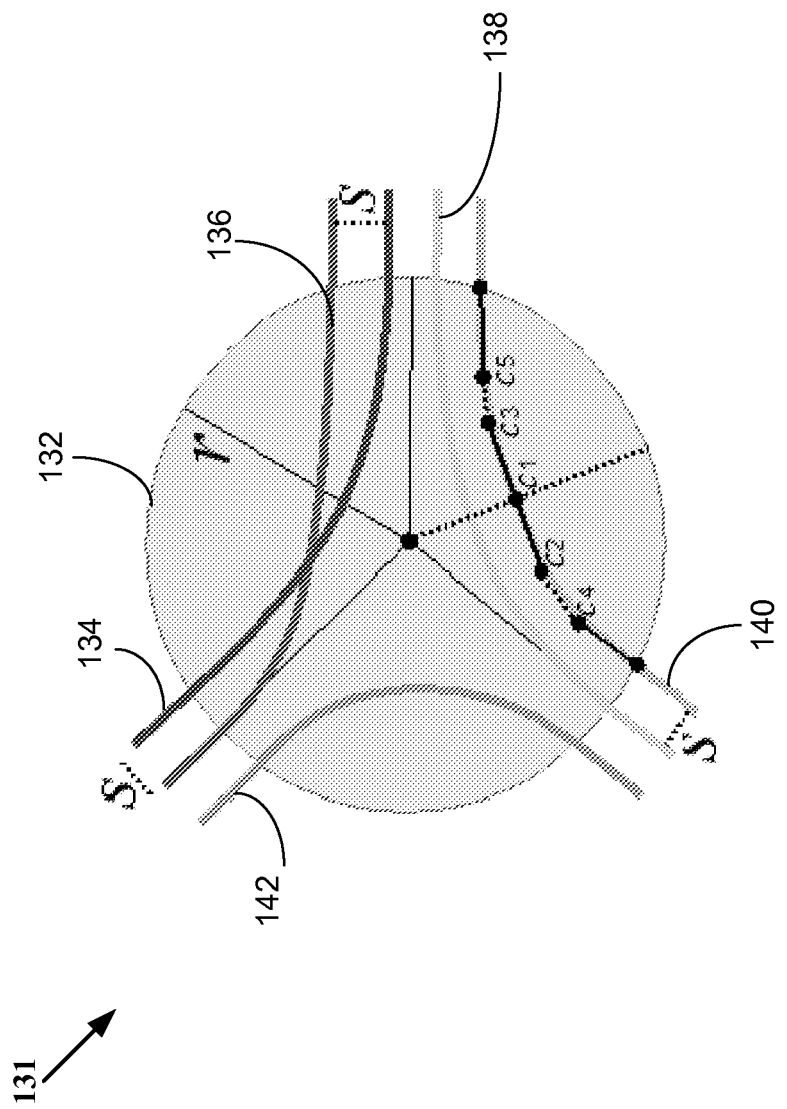
FIG. 4 is an exemplary illustration showing interactive link bundling.

Referring back to FIG. 1, the interactive bundling module 112 may be utilized to allow a user to select a subset of links that the user wishes to view in a layout that distinguishes the links more clearly. FIG. 4 illustrates an example of the interactive bundling technique. A user may select a subset of links by drawing a line through the links of interest. The interactive bundling module 112 generates a layout of the links 131 where there is angular separation between each link 134, 136, 138, 140, 142 in the bundle which allows each link to be easily distinguishable. As shown in FIG. 4, the links selected by the user are shown displayed in attenuation circle 132 where each link 134, 136, 138, 140, 142 is separated from each adjacent link by the distance S.

Referring back to FIG. 1, the interactive link magnet module 114 enables a user to control the curvature of the links associated with the same particular data attribute. A data attribute may be an identifier or label that is associated with a subset of links. For example, a node-link diagram may contain airline routes where each route consists of a sequence of links. Each link in a route may be associated with a data attribute that corresponds to the name of an airline carrier that services the route. A user may wish to view the links associated with a particular airline carrier more clearly. A virtual magnet may be used to pull those links out towards the position of the magnet so that the links are distinguishable from the rest of links in the node-link diagram 104.

FIG. 5A shows a portion of a node-link diagram having three links 152, 154, 156 and nodes 148, 150. FIG. 5B shows the placement of a magnet 160 that attracts link 158 which has a matching data attribute to the data attribute associated with the magnet. The magnetic strength of the magnet 160 alters the curvature of link 158 without altering the placement of nodes 148, 150. As shown in FIG. 5B, the direction of the magnetic force is shown by the angle $\propto$, the strength of the magnet pulls the link a distance of radius, $r_1$, from the link's original position. The radius $r_2$ is the distance of the new curvature to the center of the magnet. The magnet 160 alters the curvature of the link to a curve defined by control points c1-c5 which are used to generate a spline curve representing the modified link 158.

Although the link magnets have been shown as circular shapes having a clear center point with a magnetic strength characterized by a radius, other shapes may be used such as polyline magnets. For example, FIG. 5C illustrates a line magnet 168 having two magnets 164, 166 arranged in a linear format. Each magnet 164, 166 operates as noted above with respect to FIG. 5B and provides the user with the ability to control the curvature of several links over a wider area of the node-link diagram.

Referring back to FIG. 1, the interactive legends module 116 allows a user to control the curvature of a subset of links sharing a common attribute by altering a model curve representing the curvature of the link shown in a legend that is part of the node-link diagram. Referring to FIG. 6A, there is shown a node-link diagram 168 illustrating the reaction of certain bacterial strains. The node-link diagram 168 is a directed graph where each source node represents a substrate and the destination node is a product. The link between the source and destination node represents a bacterial strain. The node-link diagram 168 has a legend 170 showing a model curve associated with each bacterial strain in the node-link diagram 168. There is a model curve 178 associated with links representing the reptococcus-*pyogenes* strain, model curve 180 associated with links representing the mo-*sapiens* strain, and model curve 182 associated with links representing the cherichia-*coli* strain.

Each model curve has a corresponding control point 172, 174, 176. A user may use the control point on the model curve associated with a particular bacterial strain to alter the amplitude and skew angle of the curvature of all links associated with the same bacterial strain. The modifications made to a model curve are then propagated back to all links associated with the particular bacterial strain associated with the model curve throughout the node-link diagram. FIG. 6B shows the link curvature modifications propagated throughout the entire node-link diagram 186.

Referring back to FIG. 1, the spline rendering module 118 may be used to draw the modified links in the node-link diagram. The links are constructed as curves that may be implemented as splines (e.g., Bezier spline or B-spline curves, cardinal splines, etc.). A B-spline curve is a sequence of curve segments connected together to form a continuous curve. A B-spline is typically defined by four control points and a set of polynomial equations. The spline rendering module 118 constructs a curve using the coordinates of the control points and the set of polynomial equations representing a curve.

A B-spline curve is defined by control points and a knot vector. The knot vector contains a set of knot points, where each knot point is a position on the curve that subdivides the curve into a curve segment. The values of the knots are used to change the shape of a particular curve segment without changing the shape of the whole curve. The interactive link curvature processing module 102 alters one or more curve segments of a B-spline curve in order to generate the curvature of one or more links that comply with the user's action.

Some of the embodiments are described with respect to B-spline curves for illustration purposes. However, the embodiments are not constrained to B-spline curves and other such smooth curves may be utilized, such as, without limitation, quadratic or cubic Bezier curves, uniform or cardinal splines, etc.

The interactive link fanning module 110, interactive bundling module 112, interactive link magnet module 114, interactive legends module 116, and spline rendering module 118 may be a sequence of computer program instructions, that when executed by a processor, causes the processor to perform methods and/or operations in accordance with a prescribed task. These modules may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Any one or combination of the interactive link fanning module 110, interactive bundling module 112, interactive link magnet module 114, and/or interactive legends module 116 may be embodied in a software application that utilizes computer graphics to visualize graphs and/or diagrams. Examples of such software applications, may include without limitation, an Integrated Development Environment (IDE), a spreadsheet program, a graphics or diagram editor, page layout or design software, a web browser, a presentation graphics application, a word processing application, and so forth.

Although the system 100 shown in FIG. 1 has a limited number of elements in a certain configuration, it should be appreciated that the system 100 can include more or less elements in alternate configurations. Furthermore, in various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

Attention now turns to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 7:
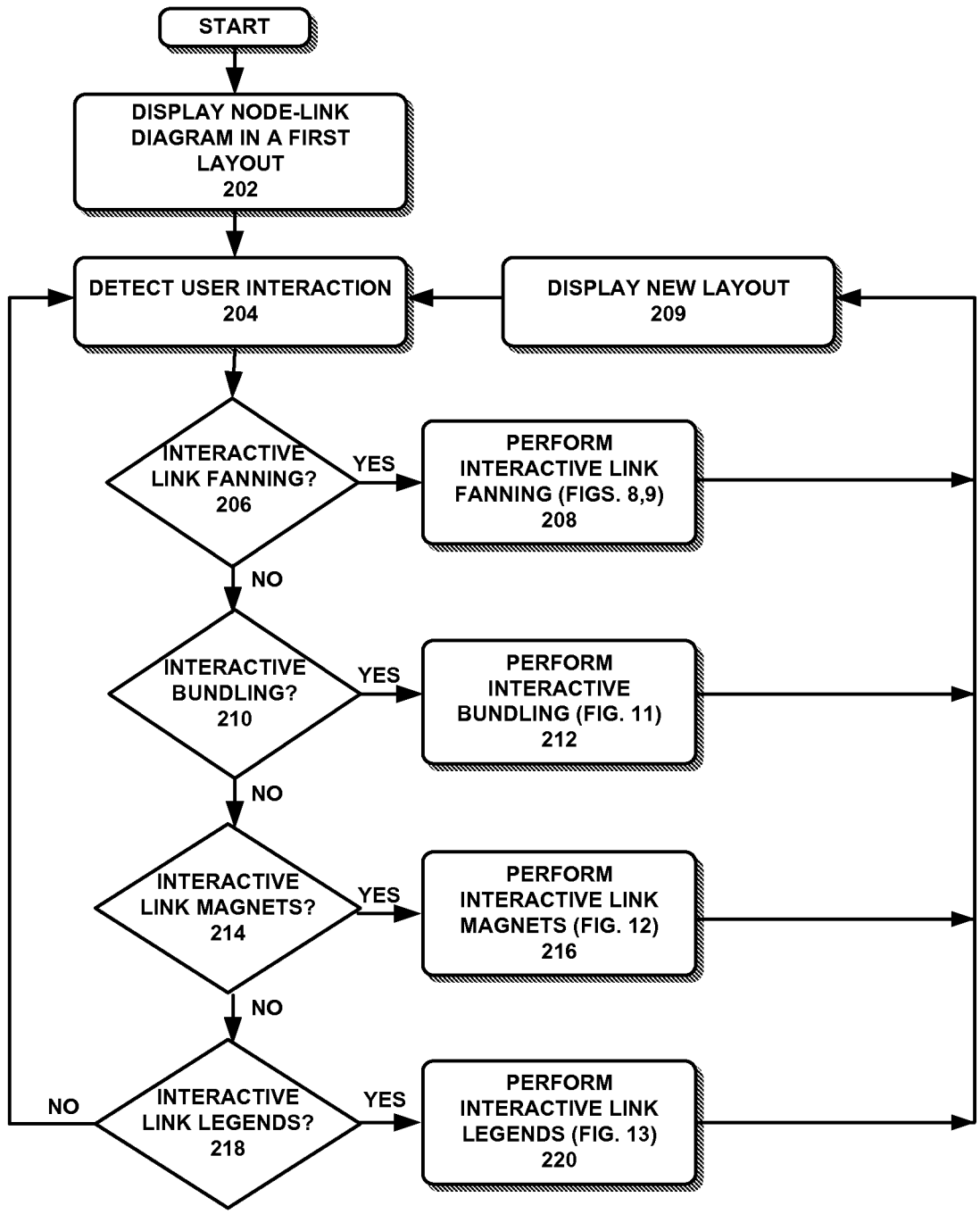
FIG. 7 is a flow diagram illustrating an exemplary method of the interactive link curvature processing.

FIG. 7 illustrates a flow diagram of an exemplary method 200 for modifying a curvature of links in a node-link diagram. It should be noted that the method 200 may be representative of some or all of the operations executed by one or more embodiments described herein and that the method can include more or less operations than what is described in FIG. 7.

Referring to FIG. 7, a node-link diagram is displayed to a user in a first layout (block 202). The user interaction module 106 detects a user action performed on the node-link diagram (block 204). Based on the user action, one of the interactive link curvature methods may be activated. If the user enacts a touch, gesture, or the like, to fan out the links of a node (block 206-yes), then the interactive link curvature method may be performed (block 208). Otherwise (block 206-no), if the user draws a line through a set of links on the node-link diagram (block 210-yes), then the interactive link bundling method may be performed (block 212). Otherwise (block 210-no), if the user facilitates the use of magnets (block 214-yes), then the interactive link magnet method may be performed (block 216). Otherwise (block 214-no), if the user interacts with a control point on a modeled curve in a legend (block 218-yes), then the interactive link legends method may be performed (block 220). Otherwise (block 218-no), the process awaits the next user action (block 204). Upon the completion of the performance of each method (blocks 208, 212, 216, 220), a new layout of the node-link diagram is displayed to the user (block 209) and the process waits for the next user action (block 204).

Figure 8:
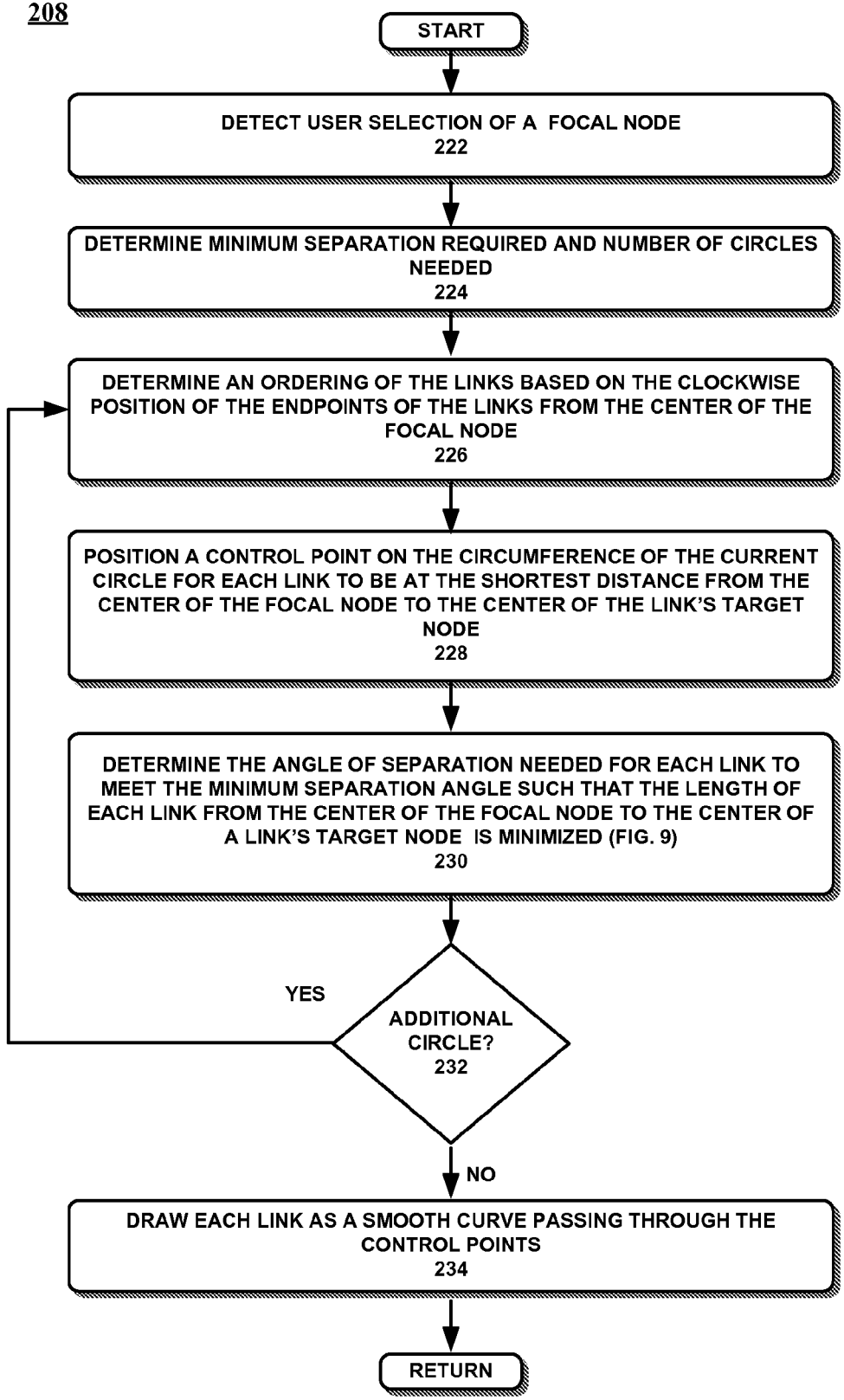
FIG. 8 is a flow diagram illustrating a first exemplary method of the interactive link fanning.

FIG. 8 illustrates a flow diagram of an exemplary method 208 for performing interactive link fanning. It should be noted that the method 208 may be representative of some or all of the operations executed by one or more embodiments described herein and that the method can include more or less operations than what is described in FIG. 8.

In interactive link fanning, the separation between adjacent links connected to a node is increased in order to improve the readability of the links connected to a particular node. The increased separation between adjacent links allows for the insertion of legends or other indicia to be associated with a link. In one or more embodiments, the separation distance between adjacent links may be calculated to be the same size even though this may result in an increased length of a link to its target node. In other embodiments, the separation distance between adjacent links may be calculated to be the minimum size needed to produce the desired spreading radius subject to minimizing the length of each link from the focal node to its respective target node and minimizing the number of link crossings.

The inputs to the interactive link fanning module 110 may be the following: (1) a set of links attached to the selected or focal node; (2) the center point of the focal node; (3) the center points of the target nodes for each of the links attached to the focal node; (4) a minimum radius, $r_1$, for an inner circle around the center of the focal node used to determine control points for the inner curve segment; (5) a number of additional concentric circles, where each circle is used to determine control points for additional spline segments; (6) the minimum separation, S, between adjacent links; and/or (7) the minimum radius for each of the concentric circles, $r_1$-$r_n$. Each concentric circle is used to determine the control points for an additional spline segment. The output of the interactive link fanning module 110 is the control points representing the curve segments that constitute the modified curvature of each link.

The interactive link fanning module 110 determines an initial placement for each link by determining the control points that would place a straight line from the center of the focal node to the center of each target node. These control points are placed on the circumference of the inner circle. These control points represent the shortest distance, or the minimal length of a link, from the focal node to its target node.

The links are then analyzed in a clockwise order. Each link that does not meet the minimum separation angle is then put in the previous link's chain and those links that exceed the minimum separation angle are placed in a new chain. Each chain contains the adjacent links that do not meet the minimum separation requirement. After visiting all the links, there may be a set of chains.

The links in each chain are then fanned out to satisfy the minimum angle separation using Procrustes analysis. Procrustes analysis is a mathematical technique used to find a projection of a rigid scale and/or rotation invariant constraint that indicates how much each link in a chain is to be moved to achieve the minimum separation angle. This projection allows an optimal movement to be determined for each link while moving other links as little as possible. Procrustes analysis allows fast processing of movement determinations performed in real time. However, after fanning, a new overlap may be created between the chains, where a link may be positioned too close to an adjacent link. For this reason, the chains are reanalyzed and the fanning may be reapplied.

Referring to FIG. 8, the user interaction module 106 may detect that the user touched a node (block 222). The user may use a two finger gesture to select a node and to simultaneously control the radius of a circle encapsulating the node (i.e., fanning or spreading radius) (block 222). Referring to FIG. 10A, there is shown a two-finger gesture that may be used to initiate interactive link fanning on a node 244. An index finger of a right hand 246 may be used to select the node 244 and the index finger of a left hand 250 may be used to control the initial fanning radius 248.

Referring back to FIG. 8, the minimum separation between adjacent links and the number of concentric circles is determined (block 224). The minimum separation between adjacent links S may be any separation specified by the user to give a pleasing minimal angle, but should be in the range: S<=(number of links)/(circumference of the inner circle). The circumference of the inner circle is based on the fanning radius provided by the user. The number and dimension of additional concentric circles may be a user input or automatically determined by the length of the longest link. The radius of the largest of the additional concentric circles would not exceed the distance of the furthest target node from the focal node. Each concentric circle produces a set of control points that are used to generate spline segments that when combined with control points from other concentric circles forms the curvature of a link.

An ordering of the links is then determined (block 226). In one or more embodiments, the order may be based on the clockwise position of the endpoints of the links from the center of the focal node (block 226). Next, an initial control point is placed on the circumference of the inner circle where the control point would produce a curve having the shortest length from the center of the focal node to the center of its target node (block 228). Then, the angle of separation is determined for each link so that the minimum separation angle is met while minimizing the length of each link from the center of the focal node to the center of the target node (block 230). Blocks 226-230 are repeated for each additional concentric circle that needs to generate additional control points. If an additional circle is required (block 232-yes), then blocks 226-230 are repeated. When all circles have been processed (block 232-no), then each link is drawn as a smooth curve passing through the control points (block 234).

Figure 9:
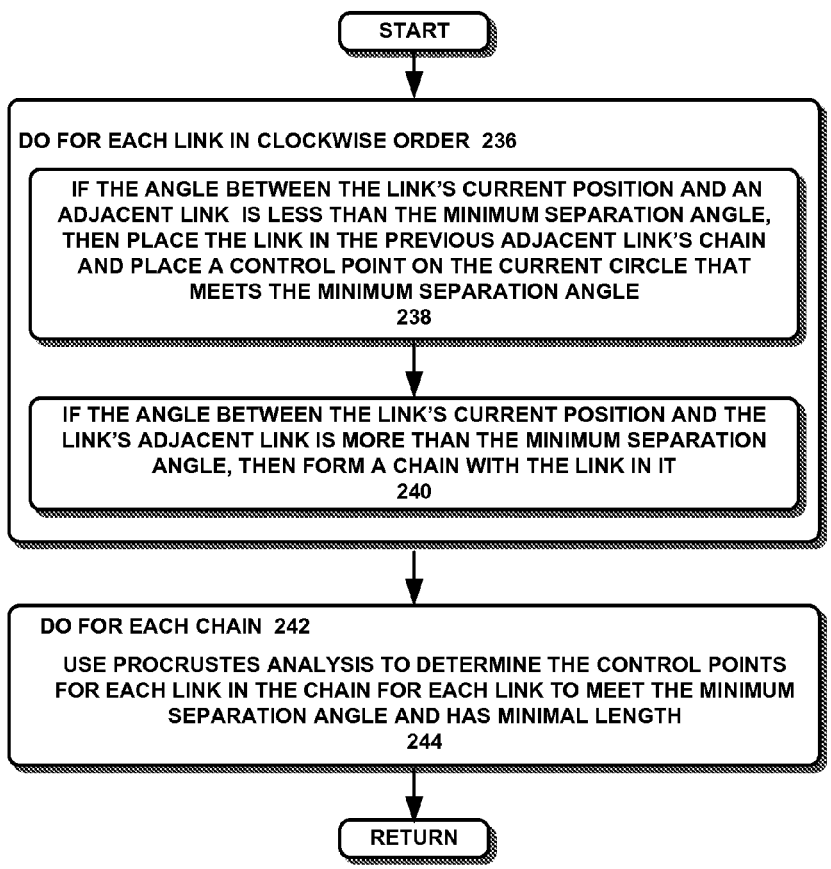
FIG. 9 is a flow diagram illustrating a second exemplary method of the interactive link fanning.

FIG. 9 illustrates the steps used to determine the angle of separation for each link. Each link is analyzed in the clockwise order previously determined in block 226 (block 236). If the current angle of separation between the link and an adjacent link is less than the desired minimum separation angle, then the link is placed in the chain of the link that precedes it in the clockwise order (block 238). A control point is placed on the circumference of the current circle that meets the minimum separation angle (block 238). If the current angle of separation between the link and an adjacent angle is more than the minimum separation angle, then the link is placed into a new chain (block 240). After all the links are analyzed, then each chain is analyzed.

For each chain (block 242), Procrustes analysis is used to determine the control points for each link in the chain that meets the minimum separation angle and which minimizes the lengths of the links (block 244). The process returns to FIG. 8.

Figure 10B:
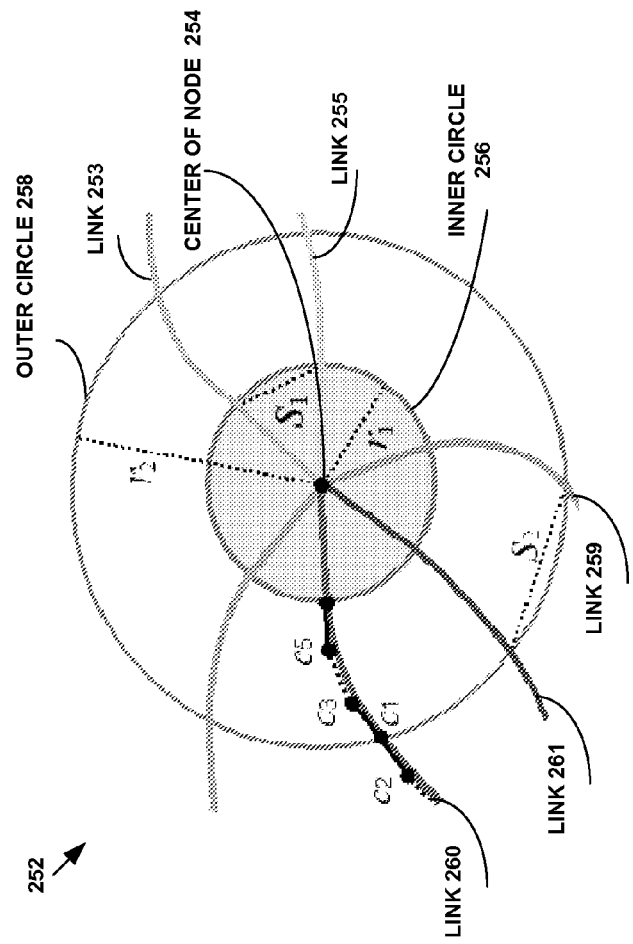
FIGS. 10A-10B are exemplary illustrations showing interactive link fanning.
Figure 10A:
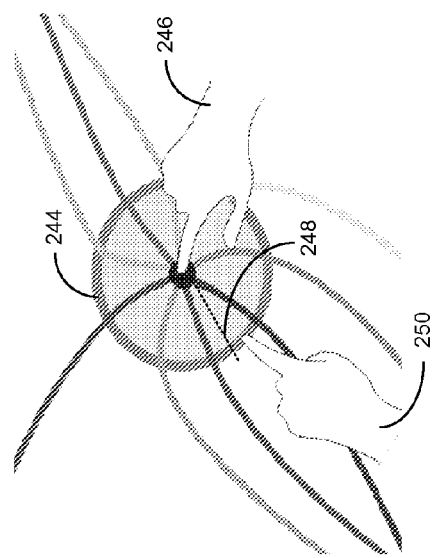

FIG. 10B illustrates an example of interactive fanning applied to node 252 using two concentric circles: inner circle 256, having radius r1; and outer circle 258 having radius r2. The curvature for link 260 is formed from curve segments utilizing control points c1, c2, c3, c5. The angle of separation, $S_1$, between links 253 and 255 on the inner circle 256 meets the minimum separation distance and the angle of separation, $S_2$, between links 259 and 261 on the outer circle 258 meets the minimum separation distance.

Figure 11:
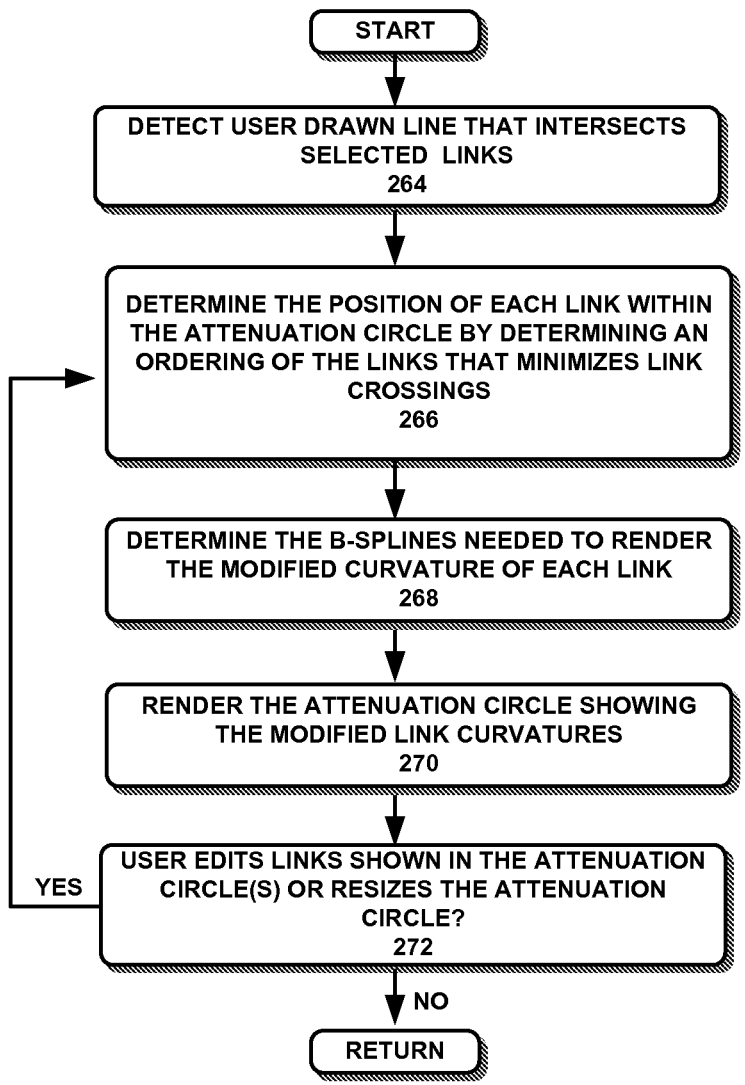
FIG. 11 is a flow diagram illustrating an exemplary method of interactive link bundling.

Attention now turns to interactive bundling. FIG. 11 illustrates a flow diagram of an exemplary method 212 for performing interactive bundling. It should be noted that the method 212 may be representative of some or all of the operations executed by one or more embodiments described herein and that the method can include more or less operations than what is described in FIG. 11.

Referring to FIGS. 4 and 11, a user may indicate their preference to bundle a set of links by placing a line through the set of links of interest (block 264). The line may be marked onto a node-link diagram 104 through a keystroke, mouse clicks, touches, gestures, or the like from the user's computing device. The line is used to create an attenuation circle 132 that is centered at the midpoint of the line. The links within the attenuation circle 132 are displayed with a larger angular separation from each other thereby making them more visible to the user.

The links are better viewed when there is minimal crossing between the links For this reason, the interactive bundling module 112 determines an order of the links to enter and exit a node that minimizes the number of link crossings that occur between nodes. The problem of determining such an order is the classic metro line crossing minimization problem. The interactive bundling module 112 may utilize any of the well-known solutions to the metro line crossing minimization problem to determine such an ordering (block 266). Next, the splines needed to render the modified link curvatures of each link is determined (block 268). Default values for the size of the attenuation circle (i.e., R, the radius of the attenuation circle) and the minimum separation, S, needed between two adjacent links is determined The attenuation circle 132 may then be rendered onto a display for the user showing the links with the modified link curvatures (block 270).

A user may then edit the attenuation circle 132 (block 272). The user may edit the links entering into the attenuation circle 132, may resize the attenuation circle 132, or make any other type of edit to the links or the attenuation circle 132 (block 272). The edits the user makes to the links and/or attenuation circle may alter the values of R and S, thereby requiring the interactive bundling module 112 to re-compute the link curvatures shown in the attenuation circle 132. In this situation (block 272-yes), the interactive bundling module 112 repeats the processing shown in blocks 266-272. When the user has no further edits to the bundled links or attenuation circle 132 (block 272-no), then the method returns back to FIG. 7.

Figure 12:
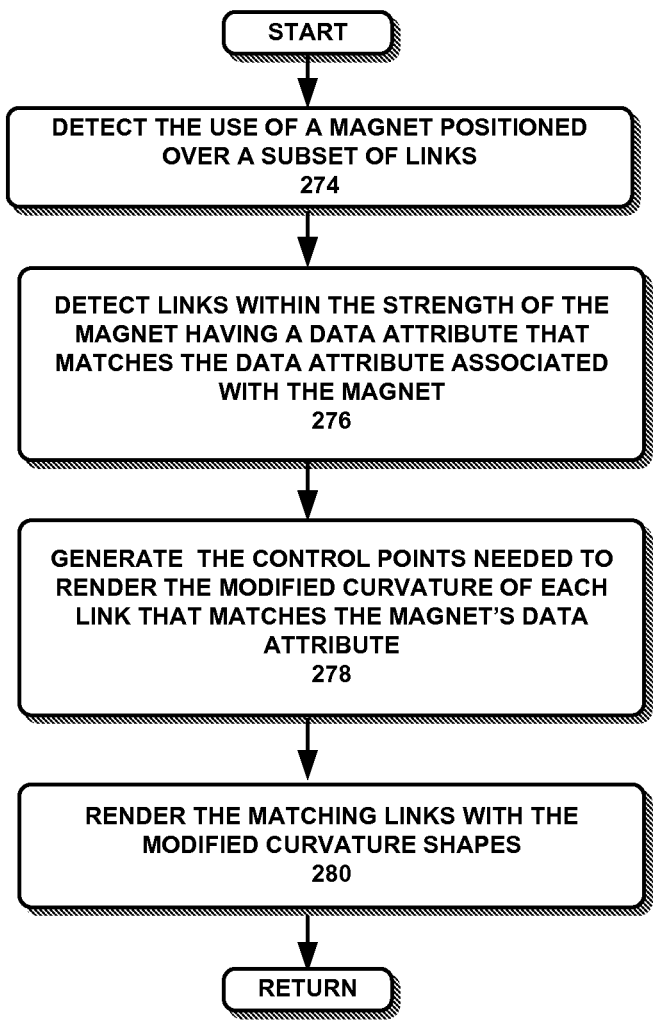
FIG. 12 is a flow diagram illustrating an exemplary method of interactive link magnets.

FIG. 12 illustrates a flow diagram of an exemplary method 216 of the interactive link magnet technique. It should be noted that the method 216 may be representative of some or all of the operations executed by one or more embodiments described herein and that the method can include more or less operations than what is described in FIG. 12.

A link magnet is a visualization technique that mimics the behavior of a physical magnet. A physical magnet has a magnetic force that pulls objects having ferromagnetic materials towards it and that repels objects composed of other types of materials. The magnetic force of a physical magnet extends within a given radius from the center of the magnet. A link magnet is configured to pull links that are associated with a particular data attribute towards it. A link magnet may have a magnetic strength that enables it to attract links within the radius of the link magnet. A user is provided with the ability to specify the magnetic strength of the magnet and one or more data attributes the magnet is attracted to. A link magnet may be implemented as draggable graphics software that is programmed to search for links having a common data attribute within a given radius and to move the curvature of the links towards the magnet.

Referring to FIG. 12, the interactive link magnet module 114 detects the use of a magnet positioned over a subset of links (block 274). The link magnet then detects links within the strength of the magnet or prescribed radius that are associated with a data attribute that matches the data attribute associated with the link magnet (block 276). For those matching links, the interactive link magnet module 114 generates the control points needed to render the modified curvature of each matching link in the direction and distance exerted by the user through the link magnet (block 278). The spline rendering module 118 may then render the matching links with the modified curvature shapes to the user (block 280).

Figure 13:
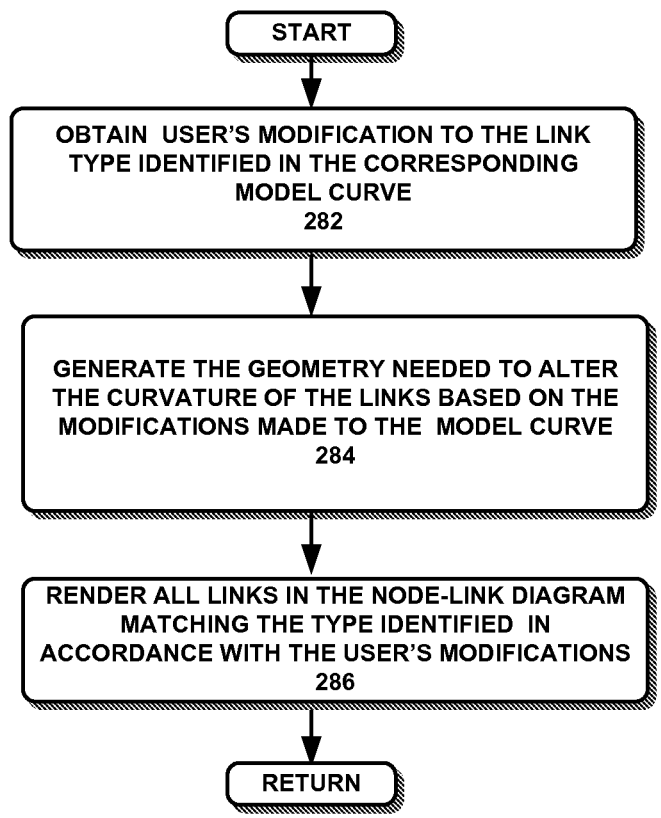
FIG. 13 is a flow diagram illustrating an exemplary method for interactive link legends.

Attention now turns to the interactive link legends technique. FIG. 13 illustrates a flow diagram of an exemplary method 218 of the interactive link legends technique. It should be noted that the method 218 may be representative of some or all of the operations executed by one or more embodiments described herein and that the method can include more or less operations than what is described in FIG. 13.

The user controls the curvature of a set of links by modifying the curvature of a model curve of the identified type shown in a legend associated with the node-link diagram (block 282). In one or more embodiments, the model curve may be based on B-splines. Referring to FIG. 14A, there is shown a legend 288 having a model curve based on B-splines. The legend shows a model curve for link 294 between source node 290 and target node 292. The link 294 was modified by a user to increase the amplitude, d, and the skew angle, $\propto$, of the model curve by interacting with a single point on the curve, c1. Control points c2-c5 are formulated to generate the new curvature in accordance with the user's actions on the model curve. However, as the new curvature is propagated to other links of the same type, there may be strong variations of the curvature due to the varied distances between each link's respective source and destination nodes. For this reason, another embodiment of the model curve is described with respect to FIG. 14B that preserves the amplitude and overall shape of the links independent of the distance between each link's source and destination node.

FIG. 14B illustrates the interactive model curve 296 based on a motif having a sinusoidal curve. A user may control the amplitude and periodicity of the sinusoidal curve by interacting with two points on the curve, c1 and c2. The new curvature 298, as shown in FIG. 14C, may easily be repeated onto each corresponding link with a consistent curvature since it is independent of the distance between each link's corresponding source and destination node.

Referring back to FIG. 13, based on the modifications made to a model curve, the interactive link legends module 115 generates the necessary geometric data needed to alter the curvature of the links of the identified type throughout the node-link diagram (block 284). This geometric data is then used to render the new curvature to the links of the identified type throughout the node-link diagram (block 286).

Figure 15:
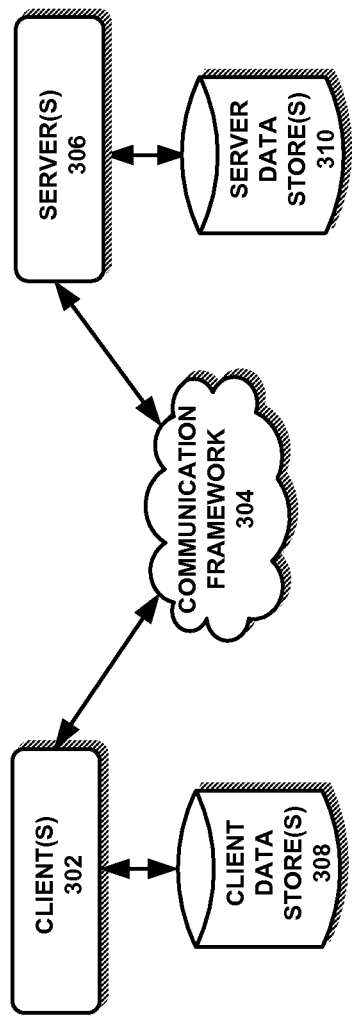
FIG. 15 is a block diagram illustrating an operating environment.

Attention now turns to a discussion of an exemplary operating environment. FIG. 15 illustrates an operating environment 300. It should be noted that the operating environment 300 is exemplary and is not intended to suggest any limitation as to the functionality of the embodiments. The embodiments may be applied to an operating environment 300 having one or more client(s) 302 in communication through a communications framework 304 with one or more server(s) 306. The operating environment 300 may be configured in a network environment, a distributed environment, a multiprocessor environment, or as a stand-alone computing device having access to remote or local storage devices.

A client 302 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 302 may also be embodied as a software module having instructions that execute in a single execution path, multiple concurrent execution paths (e.g., thread, process, etc.), or in any other manner.

A server 306 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 306 may also be embodied as a software module having instructions that execute in a single execution path, multiple concurrent execution paths (e.g., thread, process, etc.), or in any other manner.

The communications framework 304 facilitates communications between the clients 302 and the servers 306. The communications framework 304 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). A client 302 and a server 306 may include various types of standard communication elements designed to be interoperable with the communications framework 304, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Each client(s) 302 may be coupled to one or more client data store(s) 308 that store information local to the client 302.

Each server(s) 306 may be coupled to one or more server data store(s) 310 that store information local to the server 306.

Figure 16:
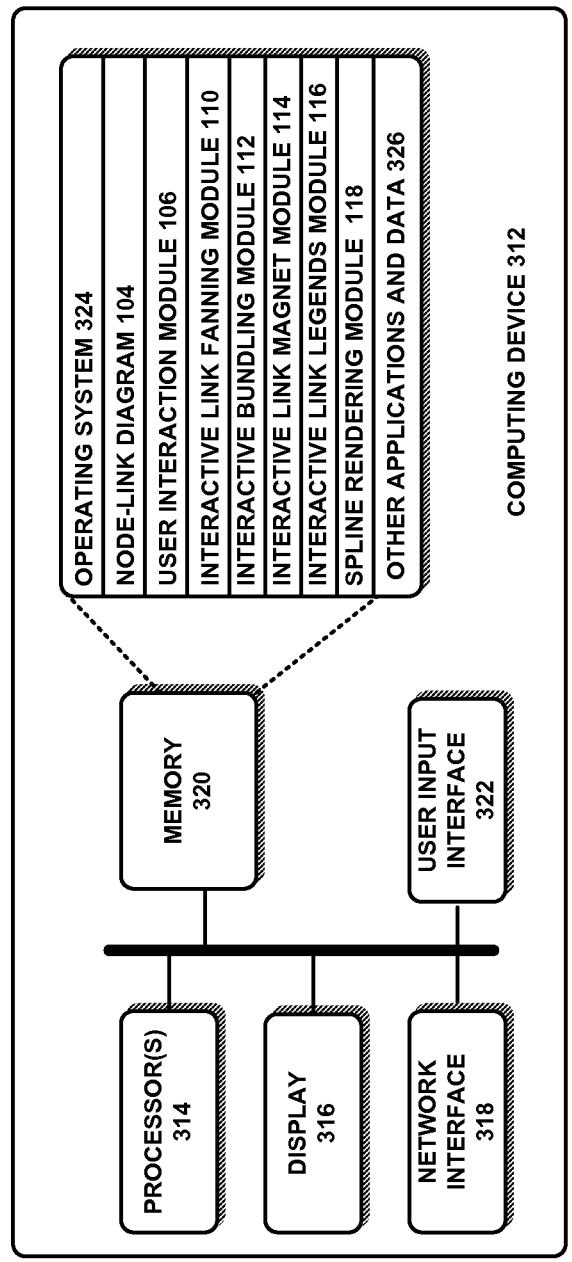
FIG. 16 is a block diagram illustrating an exemplary computing device.

FIG. 16 illustrates a block diagram of an exemplary computing device 312. The computing device 312 may have one or more processors 314, a display 316, a network interface 318, a memory 320, and a user input interface 322. A processor 314 may be any commercially available processor and may include dual microprocessors and multi-processor architectures. The display 316 may be any visual display unit including a display having touch capabilities. The network interface 318 facilitates wired or wireless communications between the computing device 312 and a network. The user input interface 322 facilitates communications between the computing device 312 and input devices, such as a keyboard, mouse, touch screen, etc.

The memory 320 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 320 may also include one or more external storage devices or remotely located storage devices. The memory 320 may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The memory may 320 contain instructions and data as follows:

- an operating system 324;
- a node-link diagram 104;
- an user interaction module 106;
- an interactive link fanning module 110;
- an interactive bundling module 112;
- an interactive link magnet module 114;
- an interactive link legends module 116;
- a spline rendering module 118; and
- various other applications and data 326.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
    displaying a node-link diagram in a first visual layout, the node-link diagram having a plurality of nodes and a plurality of links, each link being a curve that connects a source node and a target node;
    detecting a user action to the displayed node-link diagram that indicates modification to a curvature of one or more links associated with a subset of links;
    bundling the subset of links identified by the user action into an attenuation circle;
    resizing, by a user, the attenuation circle;
    spreading out the separation distance between adjacent links relative to the resized attenuation circle; and generating a second visual layout, the second visual layout displaying each link in the subset with a modified curvature of each link that differs from the first visual layout, the modified curvature altering a curvature of each link without changing a position of a source node and a target node connected to each link in the subset.

2. The computer-implemented method of claim 1, wherein detecting a user action further comprises:
identifying the subset of links from a line drawn through the subset of links; and
centering the attenuation circle at a midpoint of the line.

3. The computer-implemented method of claim 1, wherein bundling the subset of links further comprises:
determining a position for each link within the attenuation circle from an ordering of the links that minimizes link crossings; and
computing splines for altering curvatures of the links.

4. The computer-implemented method of claim 3,
wherein the ordering of the links utilizes a metro link crossing minimization solution.

5. The computer-implemented method of claim 1, further comprising:
inserting a label within an angle of separation between adjacent links.

6. The computer-implemented method of claim 1, wherein resizing, by a user, the attenuation circle further comprises:
re-determining a position for each link within the attenuation circle from an ordering of the links that minimizes link crossings; and
re-computing splines for altering curvatures of the links.

7. The computer-implemented method of claim 1, wherein the separation distance is a same minimum distance between each pair of adjacent links within a radius of the attenuation circle.

8. The computer-implemented method of claim 1, further comprising:
utilizing, by a user, an interactive link magnet to alter a shape of the curvature of a link having a same data attribute as the interactive link magnet.

9. The computer-implemented method of claim 1, further comprising:
associating a link legend with the node-link diagram, the link legend having a model curve for each type of link, each model curve having one or more control points that when modified alters a curvature of all links associated with a type of link matching the model curve.

10. A computer-readable storage medium storing thereon processor-executable instructions, that when executed perform actions, comprising:
displaying a node-link diagram in a first visual layout, the node-link diagram having a plurality of nodes and a plurality of links, each link being a curve that connects a source node and a target node;
detecting a user action to the displayed node-link diagram that indicates modification to a curvature of one or more links associated with a subset of links;
bundling the subset of links identified by the user action into an attenuation circle;
resizing, by a user, the attenuation circle;
spreading out the separation distance between adjacent links relative to the resized attenuation circle; and
generating a second visual layout, the second visual layout displaying each link in the subset with a modified curvature of each link that differs from the first visual layout, the modified curvature altering a curvature of each link without changing a position of a source node and a target node connected to each link in the subset.

11. The computer-readable storage medium of claim 10, wherein detecting a user action further comprises:
identifying the subset of links from a line drawn through the subset of links; and
centering the attenuation circle at a midpoint of the line.

12. The computer-readable medium of claim 10, wherein bundling the subset of links further comprises:
determining a position for each link within the attenuation circle from an ordering of the links that minimizes link crossings; and
computing splines for altering curvatures of the links.

13. The computer-readable medium of claim 10, wherein the separation distance is a same minimum distance between each pair of adjacent links within a radius of the attenuation circle.

14. The computer-readable medium of claim 10, the actions further comprising: inserting a label within an angle of separation between adjacent links.

15. The computer-readable medium of claim 10, wherein resizing, by a user, the attenuation circle further comprises:
re-determining a position for each link within the attenuation circle from an ordering of the links that minimizes link crossings; and
re-computing splines for altering curvatures of the links.

16. A computer-implemented method, comprising:
displaying a node-link diagram in a first visual layout, the node-link diagram having a plurality of nodes and a plurality of links, each link being a curve that connects a source node and a target node;
detecting a user action to the displayed node-link diagram that indicates modification to a curvature of one or more links associated with a subset of links;
bundling the subset of links identified by the user action into an attenuation circle;
editing, by a user, one or more of the links, so that the subset of links entering the attenuation circle differs from the first visual layout;
modifying a curvature of each link in the edited attenuation circle to produce the second layout; and
generating a second visual layout, the second visual layout displaying each link in the subset with a modified curvature of each link that differs from the first visual layout, the modified curvature altering a curvature of each link without changing a position of a source node and a target node connected to each link in the subset.

17. The method of claim 16, wherein editing, by a user, one or more of the links comprises altering a location or size of a control point associated with the one or more links.

18. The method of claim 16, wherein editing, by a user, one or more of the links comprises adjusting a separation distance between adjacent links.

19. The method of claim 16, wherein modifying a curvature of each link in the edited attenuation circle comprises:
determining a position for each link within the attenuation circle from an ordering of the links that minimizes link crossings; and
computing splines for altering curvatures of the links based on with the determined positions.

20. The method of claim 16, wherein the separation distance is a same minimum distance between each pair of the adjacent links and within a radius of the edited attenuation circle.

* * * * *